United States Patent
Kirk et al.

(10) Patent No.: US 8,489,569 B2
(45) Date of Patent: Jul. 16, 2013

(54) DIGITAL MEDIA RETRIEVAL AND DISPLAY

(75) Inventors: David Kirk, Cambridge (GB); Nicolas Villar, Cambridge (GB); Richard Banks, Egham (GB); David Alexander Butler, Cambridge (GB); Shahram Izadi, Cambridge (GB); Abigail Sellen, Cambridge (GB); Stuart Taylor, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 12/330,020

(22) Filed: Dec. 8, 2008

(65) Prior Publication Data

US 2010/0145920 A1    Jun. 10, 2010

(51) Int. Cl.
*G06F 7/00* (2006.01)
*G06F 17/30* (2006.01)

(52) U.S. Cl.
USPC ........................................................ 707/706

(58) Field of Classification Search
USPC .......................................... 707/706; 715/852
See application file for complete search history.

(56) References Cited

U.S. PATENT DOCUMENTS

| | | | |
|---|---|---|---|
| 5,524,195 A * | 6/1996 | Clanton et al. | 725/61 |
| 5,802,312 A | 9/1998 | Lazaridis et al. | |
| 5,802,361 A | 9/1998 | Wang et al. | |
| 5,825,149 A | 10/1998 | Matsumoto et al. | |
| 5,974,235 A | 10/1999 | Nunally et al. | |
| 6,043,818 A * | 3/2000 | Nakano et al. | 715/851 |
| 6,133,830 A | 10/2000 | D'Angelo et al. | |
| 6,480,121 B1 | 11/2002 | Reimann | |
| 6,798,429 B2 | 9/2004 | Bradski | |
| 6,836,726 B2 | 12/2004 | Sanchez Peiro | |
| 6,987,948 B2 | 1/2006 | Engstrom et al. | |
| 7,002,471 B2 | 2/2006 | Geddes et al. | |
| 7,009,497 B2 | 3/2006 | Nicoletti et al. | |
| 7,042,391 B2 | 5/2006 | Meunier et al. | |
| 7,145,454 B2 | 12/2006 | Linjama et al. | |
| 7,148,879 B2 | 12/2006 | Amento et al. | |

(Continued)

OTHER PUBLICATIONS

Salminen, et al., "Enhancing Bluetooth Connectivity with RFID", retrieved on Sep. 29, 2008 at <<http://ieeexplore.ieee.org/stamp/stamp.jsp?arnumber=01604790 >>, IEEE International Conference on Pervasive Computing and Communications (PERCOM), 2006, pp. 1-6.

"Slashdot, Shake a Secure Bluetooth Connection", retrieved on Oct. 3, 2008 at <<http://mobile.slashdolorg/article.pl?sid=07/11/17/1231254>>, 2008, pp. 1-10.

Gellersen, et al, "Multi-Sensor Context-Awareness in Mobile Devices and Smart Artefacts", available at least as early as Nov. 15, 2006, at <<http://www.comp.lancs.ac.uk/~hwg/publ/monet.pdf>>, pp. 1-17.

(Continued)

*Primary Examiner* — Fred I Ehichioya
*Assistant Examiner* — Kris Mackes
(74) *Attorney, Agent, or Firm* — Zete Law, P.L.L.C.; MacLane C. Key

(57) ABSTRACT

Retrieval and display of digital media items is described. For example, the digital media items may be photographs, videos, audio files, emails, text documents or parts of these. In an embodiment a dedicated apparatus having a touch display screen is provided in a form designed to look like a domestic fish tank. In an embodiment graphical animated agents are depicted on the display as fish whose motion varies according to at least one behavior parameter which is pseudo random. In embodiments, the agents have associated search criteria and when a user selects one or more agents the associated search criteria are used in a retrieval operation to retrieve digital media items from a store. In some embodiments media items are communicated between the apparatus and a portable communications device using a communications link established by tapping the portable device against the media retrieval and display apparatus.

20 Claims, 12 Drawing Sheets

U.S. PATENT DOCUMENTS

| | | | |
|---|---|---|---|
| 7,403,744 | B2 | 7/2008 | Bridgelall |
| 7,427,926 | B2 | 9/2008 | Sinclair et al. |
| 7,512,685 | B2 | 3/2009 | Lunsford et al. |
| 7,738,411 | B2 | 6/2010 | Koponen et al. |
| 7,882,196 | B2 | 2/2011 | Fujii et al. |
| 7,986,917 | B2 | 7/2011 | Ahlgren et al. |
| 8,165,523 | B2 | 4/2012 | Makela et al. |
| 2002/0123325 | A1 | 9/2002 | Cooper |
| 2004/0179545 | A1 | 9/2004 | Erola et al. |
| 2004/0192383 | A1 | 9/2004 | Zacks et al. |
| 2004/0203381 | A1 | 10/2004 | Cahn et al. |
| 2005/0037709 | A1 | 2/2005 | Hwang |
| 2005/0110778 | A1 | 5/2005 | Ben Ayed |
| 2005/0278157 | A1 | 12/2005 | Raschke |
| 2006/0005156 | A1 | 1/2006 | Korpipaa et al. |
| 2006/0055700 | A1* | 3/2006 | Niles et al. .................... 345/473 |
| 2006/0092866 | A1 | 5/2006 | Kim et al. |
| 2006/0126524 | A1 | 6/2006 | Tateson |
| 2006/0252374 | A1 | 11/2006 | Ban et al. |
| 2006/0256074 | A1 | 11/2006 | Krum et al. |
| 2007/0018800 | A1 | 1/2007 | Boss et al. |
| 2007/0026797 | A1 | 2/2007 | Borjeson et al. |
| 2007/0032270 | A1 | 2/2007 | Orr |
| 2007/0066323 | A1 | 3/2007 | Park et al. |
| 2007/0079383 | A1 | 4/2007 | Gopalakrishnan |
| 2007/0120832 | A1 | 5/2007 | Saarinen et al. |
| 2007/0146347 | A1 | 6/2007 | Rosenberg |
| 2007/0188323 | A1* | 8/2007 | Sinclair et al. ............. 340/568.1 |
| 2008/0036591 | A1 | 2/2008 | Ray |
| 2008/0109306 | A1* | 5/2008 | Maigret et al. .................. 705/14 |
| 2008/0120294 | A1 | 5/2008 | Davis |
| 2008/0166966 | A1 | 7/2008 | Hamasaki et al. |
| 2008/0174550 | A1 | 7/2008 | Laurila et al. |
| 2008/0195735 | A1 | 8/2008 | Hodges et al. |
| 2009/0088077 | A1 | 4/2009 | Brown et al. |

OTHER PUBLICATIONS

Hazas, et al., "A Relative Positioning System for Co-located Mobile Devices", available at least as early as Nov. 15, 2006, at <<http://www.teco.edu/~krohn/ultrasound.pdf>>, pp. 1-14.

Hinckley, "Bumping Objects Together as a Semantically Rich Way of Forming Connections between Ubiquitous Devices", available at least as early as Nov. 15, 2006, pp. 1-2.

Hughes, et al, "MESH: Supporting Mobile Multi-modal Interfaces", available at least as early as Nov. 15, 2006, at <<http://www.sarc.qub.ac.uk/~somodhrain/palpable/162_HughesCopyright.pdf>>, ACM, 2004, pp. 1-2.

USPTO translation of Office Action for JP20050278637, dated Aug. 14, 2006, 33 pages.

Kirovski, et al., "The Martini Synch", available at least as early as Nov. 15, 2006, pp. 1-10.

Final Office Action for U.S. Appl. 11/627,100 , mailed on Jun. 21, 2011, Stephen Hodges, "Motion Triggered Data Transfer".

Pallotta, et al., "RoamBlog", available at least as early as Nov. 15, 2006, at <<http://diuf.unifr.ch/pai/research/welcome/RoamBlog/RoamBlog.pdf>>, pp. 1-16.

Rekimoto, et al., "Proximal Interactions: A Direct Manipulation Technique for Wireless Networking", available at least as early as Nov. 15, 2006, at <<http://www.csl.sony.co.jp/person/rekimoto/papers/int3.pdf>>, pp. 1-8.

Stajano, et al., "The Resurrecting Duckling: Security Issues for Ad-hoc Wireless Networks", available at least as early as Nov. 15, 2006, Springer-Veriag Berlin Heidelberg, 2000, pp. 1-12.

"TechFest Live", retrieved on Oct. 25, 2006, at <<5. http://research.microsoft.com/displayArticle.aspx?id=1410>>, pp. 1-2.

* cited by examiner

DIGITAL MEDIA RETRIEVAL AND DISPLAY

BACKGROUND

Digital media items such as photographs and videos are typically stored in the home using conventional personal computers, laptop computers and the like. For example, family digital photographs may be stored on the hard drive of a personal computer (PC), on a CD or other computer-readable storage medium and are retrieved and displayed using suitable application software on the home PC. Whilst this is a good workable solution, there are many drawbacks. Significant effort is required on the part of the user to store the photographs and videos since the PC must be turned on and connected to the digital camera, camera phone, or other image capture device. The particular software application for copying the digital media onto the PC needs to be activated and this may be a complex operation, especially when the PC is already being used for other purposes. A software application for retrieving and displaying the digital media needs to be activated and different software applications may be required for different types of digital media such as videos and still images. In addition, the living area of the home in which a family may wish to view the digital media may not be the location of a home PC.

Once the digital media are stored it also requires significant effort for a user to retrieve and display the media items. For example, a user may scroll through pages of thumbnail images of still images or lists of file names of video clips which are difficult to interpret and understand. If the digital media are tagged in some way it may be possible to search and retrieve digital media items using key words but this requires effort on the part of the user to think of key words and enter them into a search interface. It may be possible to randomly select digital media items for display for example, using a picture show screen saver. By using a PC a user gains great flexibility and choice in the task of retrieving and displaying digital media. However, this flexibility and choice comes with the cost of increased complexity. Also, the PC itself is costly and not suited for use in a domestic living area.

Dedicated digital photo frames are known which select digital photographs from a database and display those on a dedicated screen which is designed for use in a home living area. Because these types of device are limited in the types of retrieval that are possible they are simpler to use than the PC methods described above. For example, they typically do not provide for key word retrieval and operate with a minimum of interface manipulations. Typically, a set of images is loaded onto the dedicated digital photo frame device from an SD card or USB stick for example. The images are presented in either a set manner, for example in order of time or date of capture or are completely randomized. Typically there is no mechanism for searching for images or otherwise shaping the recall of images on the device. This must be done previously on a secondary PC system before the images are loaded onto the digital photo frame device.

The embodiments described below are not limited to implementations which solve any or all of the disadvantages of known digital media retrieval and display systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Retrieval and display of digital media items is described. For example, the digital media items may be photographs, videos, audio files, emails, text documents or parts of these. In an embodiment a dedicated apparatus having an interactive touch display screen is provided in a form designed to look like a domestic fish tank. In an embodiment graphical animated agents are depicted on the display as fish whose motion varies according to at least one behavior parameter which is pseudo random. In embodiments, the agents have associated search criteria and when a user selects one or more agents the associated search criteria are used in a retrieval operation to retrieve digital media items from a store. The retrieved digital media items are displayed on the display. In some embodiments media items are communicated between the apparatus and a portable communications device using a communications link established by tapping the portable device against the media retrieval and display apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a dedicated digital media retrieval and display system where the digital media comprise photographs and videos, the system described is provided as an example and not a limitation. As those skilled in the art will appreciate, the present examples are suitable for application in a variety of different types of digital media retrieval and display systems.

Figure 1:
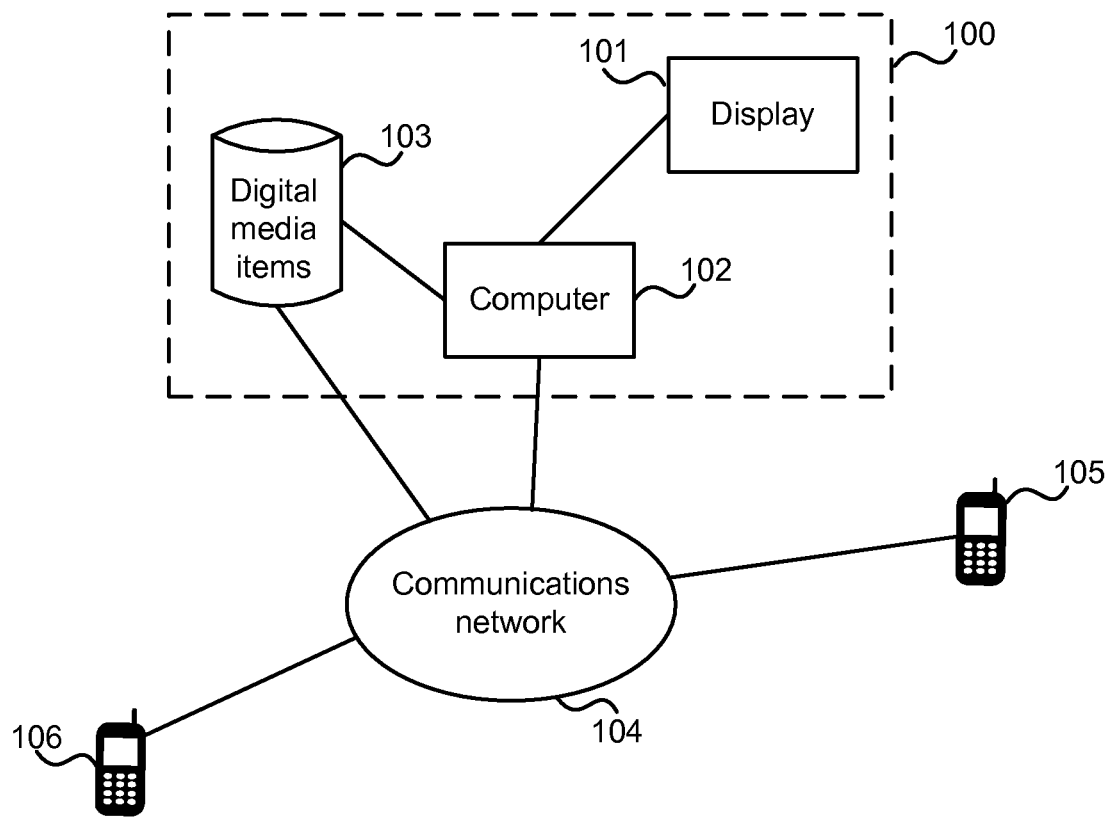
FIG. 1 is a schematic diagram of a digital media retrieval and display system.

FIG. 1 shows a digital media retrieval and display apparatus 100 having a computer 102 connected to a display 101 and also to a store holding digital media items 103. The computer may be a personal computer (PC), laptop computer or any other computing device suitable for retrieving digital media items from the store 103 and displaying these items on display 101. In some embodiments, the computer has short range wireless communication capability. The display may be a touch screen, a liquid crystal display, a plasma screen, a projector arranged to project onto a surface or any other type of display capable of displaying graphical animations. In some embodiments the display has an associated loudspeaker for presenting audio digital items. The display has an associated user interface. For example, this may be provided as part of the display itself in the case of a touch screen. It is also possible to use a separate user input device such as a keyboard and/or mouse. A non-exhaustive list of examples of digital media items is digital photographs, images, video clips, audio files, emails, text documents, text messages. Electronic ink documents including parts of any of these things.

The store of digital media items maybe a database or any other memory either integral with the computer 102 or in communication with the computer 102. The store may be distributed or centralized. In some embodiments the store is geographically located remote of the computer 102 and accessed via a communications network 104 which may be the Internet or any other communications network. Any combination of remote stores and stores local to or integral with the computer 102 may be used.

Also shown in FIG. 1 are communication devices 105, 106 which may be camera phones or other portable communications devices having ability to store one or more digital media items and having short range wireless communication functionality such as Bluetooth (trademark) capability.

The computer 102 is arranged to control the display 101 such that at least one graphical animated agent is presented on the display. In the examples described herein these agents are depicted as fish on the display although this is not essential; they may depict any moving entity. A non-exhaustive list of examples is abstract objects, living organisms, animals, insects, flowers, butterflies, birds. Each agent is associated with search criteria for retrieving digital media items. The search criteria are stored at the computer 102 or at the digital media store or at any other location or combination of locations accessible to the computer 102. The agents may be placed in one of at least two modes by the computer 102. One of these modes is an autonomous mode in which the agent moves on the display, its motion and presence on the display being determined by at least one behavior parameter which is pseudo random. During the autonomous mode the user is able to select one or more of the displayed agents in order to trigger an information retrieval operation using the search criteria of the selected agent(s). Digital media items retrieved by the operation are displayed on the display for example, graphically and/or audibly.

Figure 2:
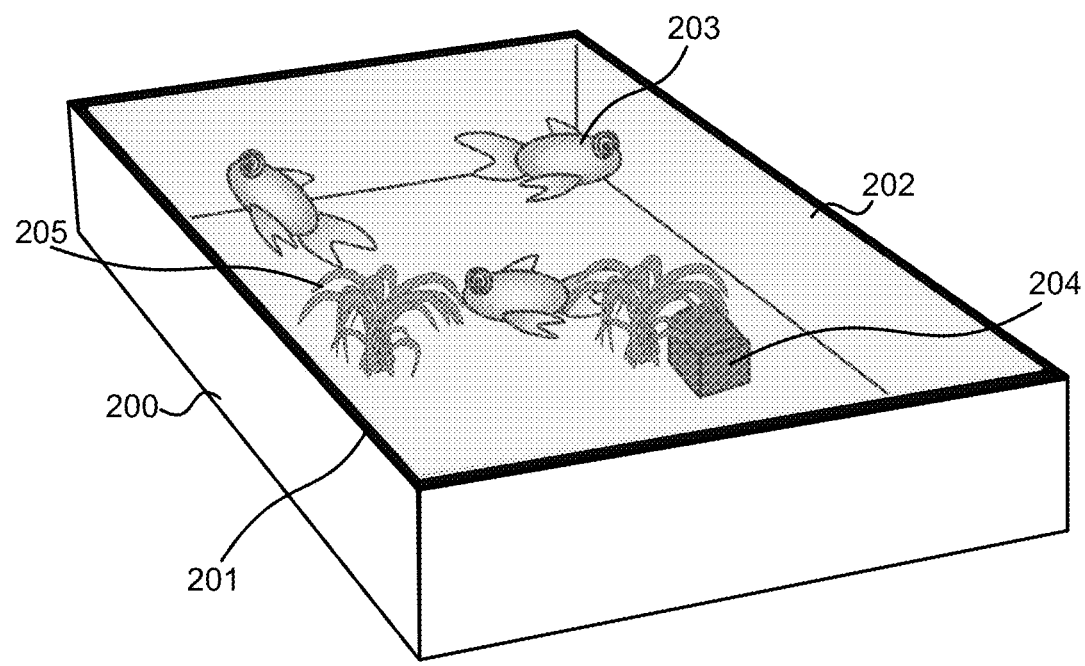
FIG. 2 is a schematic diagram of a dedicated digital media retrieval and display apparatus in a horizontal configuration.

FIG. 2 shows a dedicated digital media retrieval and display apparatus suitable for use in a home living area. It is designed to look like a domestic aquarium to help with adoption of the device in the home.

In this case the display comprises a horizontally arranged touch screen 202 supported on a frame having sides 200 made of wood, plastic or any other suitable material. The frame may optionally have an edge 201 arranged to facilitate communication with other devices as described in more detail below. A computer 102 is provided inside the frame and is not visible in FIG. 2. The arrangement is designed to represent a real fish tank for top down viewing. Graphical animated agents 203 are presented on the touch screen 202 in such a manner as to give the impression of 3D depth. In this example, the graphical animated agents 203 are depicted as fish and aquatic plants 205 are also graphically represented as is a chest 204 which is designed to represent a store holding digital media items. When a user touches a fish 203 on the touch screen 202 this triggers a media retrieval operation. The fish 203 is shown as swimming to the chest 204 and pulling out one or more media items which may be graphically represented on the touch screen 202. The fish 203 swims to a region of the touch screen 202 carrying the graphically represented retrieved items and pastes those across the display screen. For example, the fish pastes a window onto the screen in which one or more photographs are displayed or a video clip presented. The retrieved items are retrieved using the search criteria associated with the selected fish.

An indication of the search criteria associated with a particular graphical agent may be incorporated in the graphical representation of that agent. For example, a blue fish may be arranged to retrieve digital media photographs containing the color blue. A green fish may be arranged to retrieve digital media items relating to landscapes. A fish having a picture of a person's face may be arranged to retrieve digital media items containing an image of that person. A fish having a picture of a building on its side may be arranged to retrieve digital media items having the associated key word "building" or comprising an image of a building.

Different types of user input action may be used to trigger the media retrieval operation. For example, a double tap may trigger retrieval of a single media item. A tickle action may trigger retrieval of a series of media items to be presented on the display in serial fashion. The speed of the user input action may be used to indicate the speed at which the series of media items are to be presented.

During an autonomous mode, a graphical animated agent moves about, onto and off the display, according to at least one behavior parameter which is pseudo random. For example, in the case that the agents are depicted as fish, the fish are displayed as swimming about in the fish tank. The fish may disappear from view behind other graphically presented objects (such as aquatic plants or rocks) and may disappear from view off the display. The fish reappear and swim about at different speeds and with different behaviors. The behavior of each agent may be specified by one or more behavior parameters. These behavior parameters may be configured in advance and are optionally adjustable by the user. For example, a user may select a button in the bottom corner of the display in order to present a graphical user interface on the display. This may then be used to adjust behavior parameters of the graphical agents.

Because at least one behavior parameter for each agent is pseudo random, the behavior of an agent always comprises an element of chance or serendipity. This alters the user's propensity for engagement with different search retrieval operations (search criteria). The user therefore does not have complete control over retrieval and display of media items as compared with using a PC for example, to retrieve items from a database using key words. In some embodiments, a degree of control is provided however, as the user is able to specify and adjust the behavior parameters.

A great variety of possible behavior parameters may be used in different combinations and a non-exhaustive list of examples is now given:

speed; degree of shyness/extroversion (proportion of time spent visible on the display); circadian rhythm (time periods during the day or night when the agent is likely to be moving on the display); aggressiveness (how likely an agent is to chase other agents); propensity to breed (how likely it is that an agent will create offspring agents); excitement (degree of variation of direction).

The behavior parameters may comprise a spontaneity parameter used to control a frequency with which the search criteria of an agent are used to retrieve and display a media item without the need for user input to trigger the retrieval.

Figure 3:
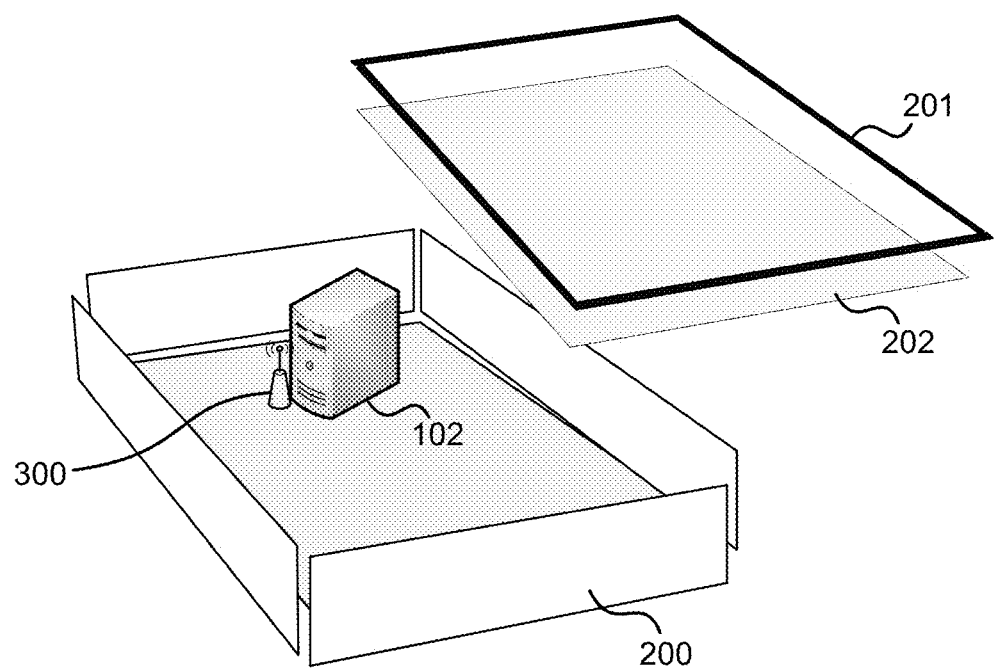
FIG. 3 is an exploded view of the dedicated digital media retrieval and display apparatus of FIG. 2.

FIG. 3 is an exploded view of the apparatus of FIG. 2. The interactive display screen 202 may be provided with a border or frame 201 which incorporates a vibration sensor as described in more detail below. The vibration sensor may run the entire length of the border or frame 201 or may be incorporated only in one or more parts of that border of frame 201. The apparatus has sides 200 arranged around a computer 102 which optionally has a short range wireless transceiver 200. The computer is arranged to control the display screen 202, the vibration sensor and the short range wireless transceiver 200.

Figure 4:
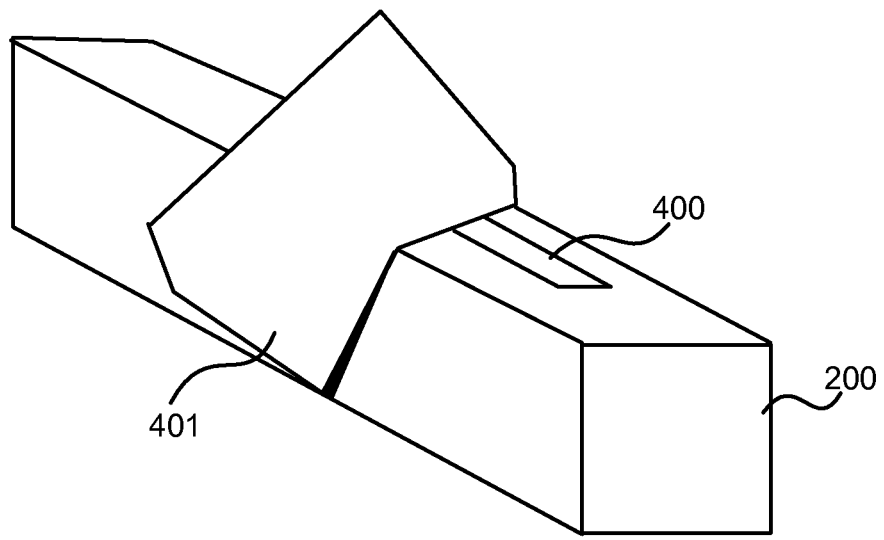
FIG. 4 is a schematic diagram of part of the frame of a dedicated digital media retrieval and display apparatus.

FIG. 4 shows part of the border or frame 201 of FIG. 3. It comprises a flexible, deformable, cover 401 such as a rubberized strip positioned around the edge of the sides 200 of the apparatus. This cover 401 is placed over a vibration sensor 400 supported on the sides of the apparatus 200 and serves to protect the vibration sensor from dirt, moisture and the like.

Figure 5:
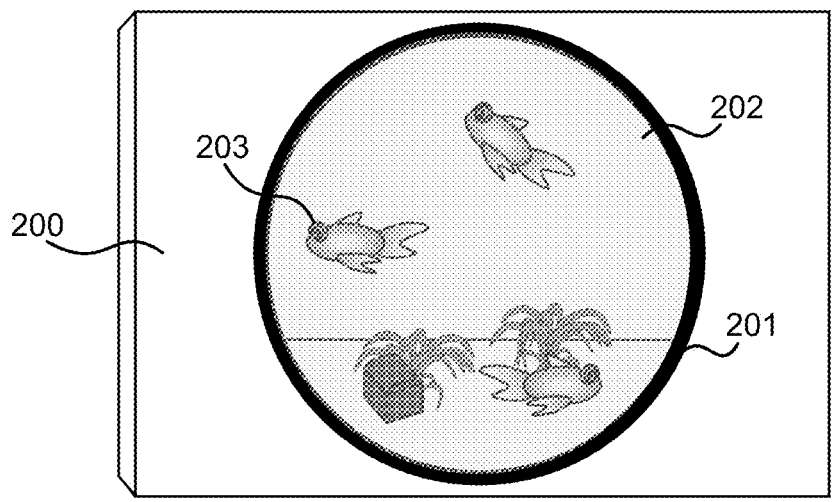
FIG. 5 is a schematic diagram of a port hole configuration of a dedicated digital media apparatus.

FIG. 5 shows another arrangement of the apparatus which provides a port-hole configuration. In this case the display screen 202 is substantially vertical and the border 201 is circular. The display screen itself may be square or rectangular with the visible part of the display being circular.

Figure 6:
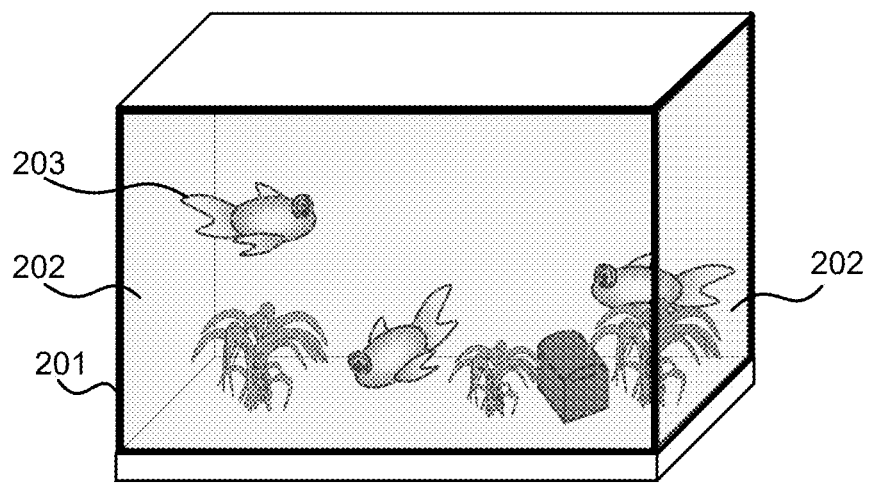
FIG. 6 is a schematic diagram of a fish tank configuration of a dedicated digital media apparatus.

FIG. 6 shows another embodiment in which the apparatus is arranged to represent a three dimensional fish tank. Two or more display screens 202 are arranged to represent sides of a fish tank and the graphical animated agents are presented in such a manner as to suggest a three-dimensional fish tank.

Figure 7:
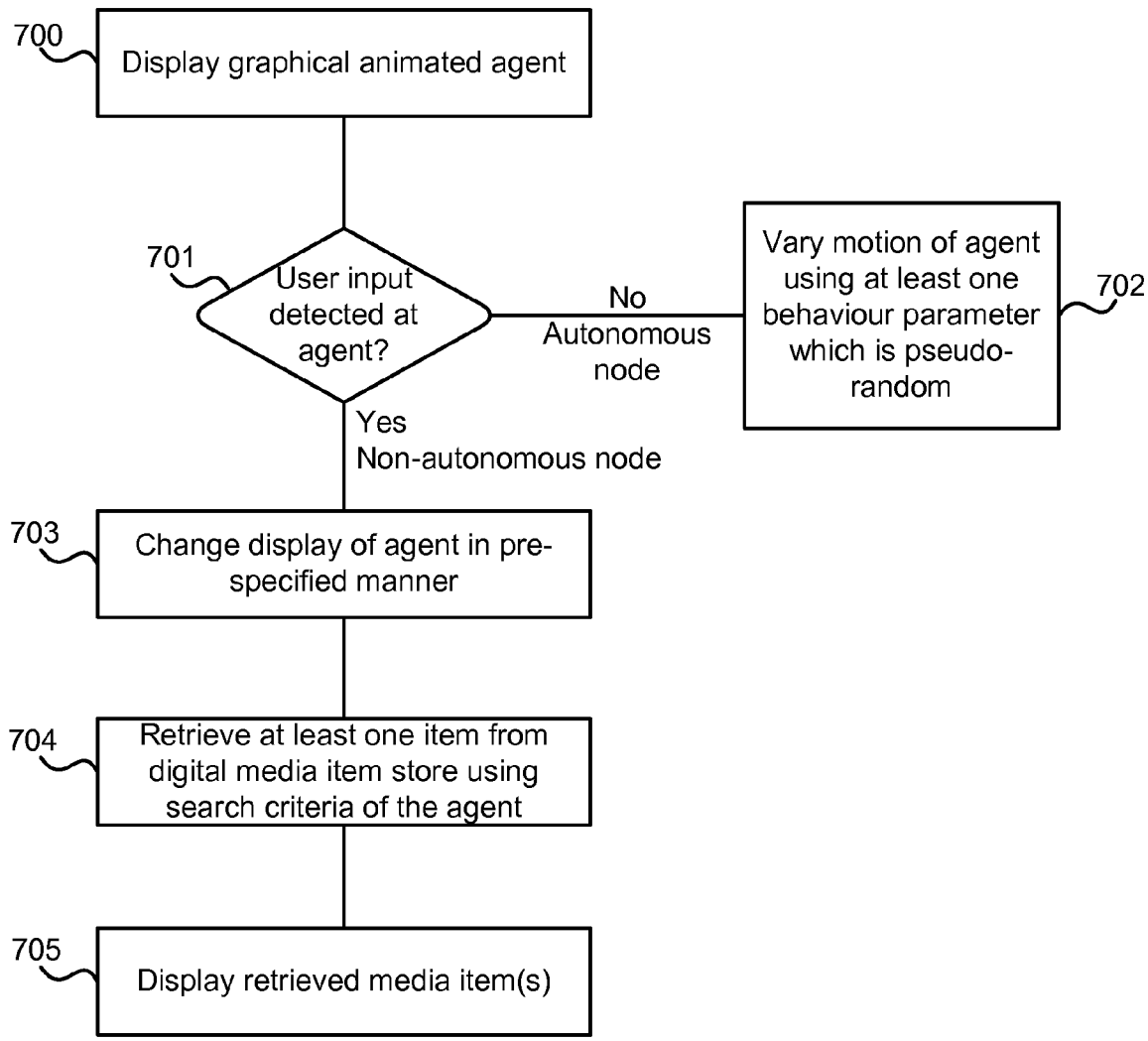
FIG. 7 is a block diagram of a computer-implemented method at a dedicated digital media apparatus.

FIG. 7 is a flow diagram of an example method implemented at the computer 102. A graphical animated agent is displayed 700 at display 101. The computer monitors 701 for user input at the agent. If no user input is detected the computer varies the motion of the agent on the display using at least one behavior parameter which is pseudo random. If user input is detected the agent enters a non-autonomous mode. The computer changes the display of the agent in a pre-specified manner. For example, if the agent is a graphical fish, the fish is shown as swimming to a store on the display and retrieving items. In other embodiments, the selected graphical agent may simply be removed from the display or may remain static. The computer is arranged to retrieve 704 at least one item from the digital media item store using the search criteria of the agent. The retrieved media items are then displayed 705 at the display.

It is also possible for more than one agent to be selected at step 701 by simultaneous or sequential user input at the display. In this case, the search criteria of each selected agent are combined using Boolean operators or in any other manner. The combined search criteria are then used in the information retrieval operation and the retrieved media items displayed at step 705.

After the retrieved media items have been displayed for a specified time at step 705 the displayed media items are removed and the display returns to a state in which the graphical animated agents are in autonomous mode.

Figure 8:
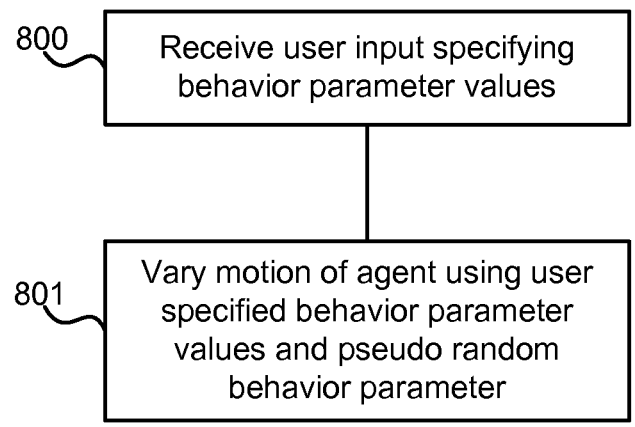
FIG. 8 is a block diagram of another computer-implemented method at a dedicated digital media apparatus.

As mentioned above, the computer is optionally arranged to provide a graphical user interface at the display to enable behavior parameters of the agents to be specified. User input is received (block 800 FIG. 8) specifying one or more behavior parameter values or ranges of values. The computer then varies the motion of the agents using the user specified behavior parameter values as well as the pseudo random behavior parameter.

Figure 9:
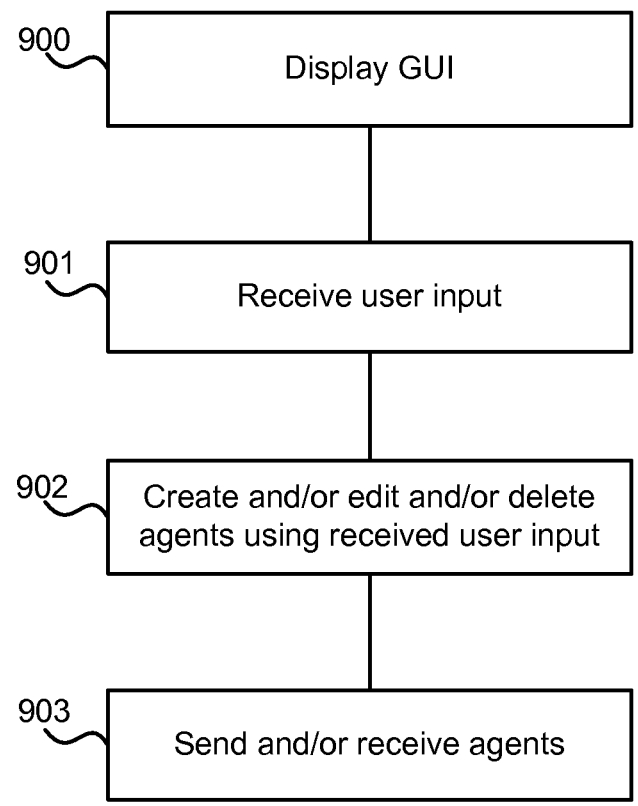
FIG. 9 is a block diagram of another computer-implemented method at a dedicated digital media apparatus.

In some embodiments the user is able to create and/or edit and/or delete agents. For example, this is achieved by providing a graphical user interface at the display which appears when the user selects a button at the bottom corner of the screen. Any other suitable user interface may be used. In one embodiment, a graphical user interface is displayed 900 of FIG. 9, user input is received 901 and the computer creates and/or edits and/or deletes agents using the received user input 902. The computer may also send and/or receive an agent in any suitable manner. For example, an agent may be uploaded onto a communications device such as a mobile phone via a short range wireless communications link. An agent may also be attached or incorporated into a message such as an email and communicated with another entity.

In some embodiments third party applications are used to create and edit the graphical agents and their associated search criteria and behavior parameters. These graphical agents may be stored and exchanged or sold.

In some embodiments, the computer is arranged to spontaneously activate one or more of the agents to retrieve media items using their associated search criteria.

It is also possible for the computer to be arranged to spontaneously create or edit or delete agents according to pre-specified rules, criteria or parameters. For example, the computer may be arranged to create agents to represent breeding such that offspring agents have search criteria which are variations of parent agent search criteria. In another example, the computer may be arranged to modify agent behavior parameters according to frequency of user input at the agents. For example, agents may become more active and/or may spontaneously present media items more frequently, if those agents are selected by users more often.

In some embodiments the media retrieval and display apparatus (100 of FIG. 1) incorporates mechanisms for communicating media items with other entities such as portable communications devices 105, 106. For example, this is achieved using any suitable short range wireless communications link between the media retrieval and display apparatus and a portable device such as a mobile phone, PDA, laptop computer or the like.

In an embodiment the portable communications device comprises an accelerometer and the media retrieval and display apparatus 100 comprises a vibration sensor. The portable communications device is tapped or knocked repeatedly on the media retrieval and display apparatus 100 as part of a process of establishing communication between the two entities. This is achieved as described in US patent publication US 2007/0188323 which is incorporated herein by reference in its entirety.

The use of this "tapping" method to establish transfer of media items between entities is useful in the case that several mobile communications devices are in communications range of a situated media retrieval and display apparatus. In that case, the media retrieval and display apparatus is able to discover the mobile devices but needs to decide which to communicate with. The tapping method enables this decision to be made easily, simply and accurately. In addition, no user interface manipulations on either device are required to establish exchange of media items and this significantly improves ease of use. A communications link between the two entities is authenticated by relative association of timing of peak accelerometer reading changes (in the mobile communications device) and peak vibration impact sensing on the media retrieval and display apparatus.

Figure 10:
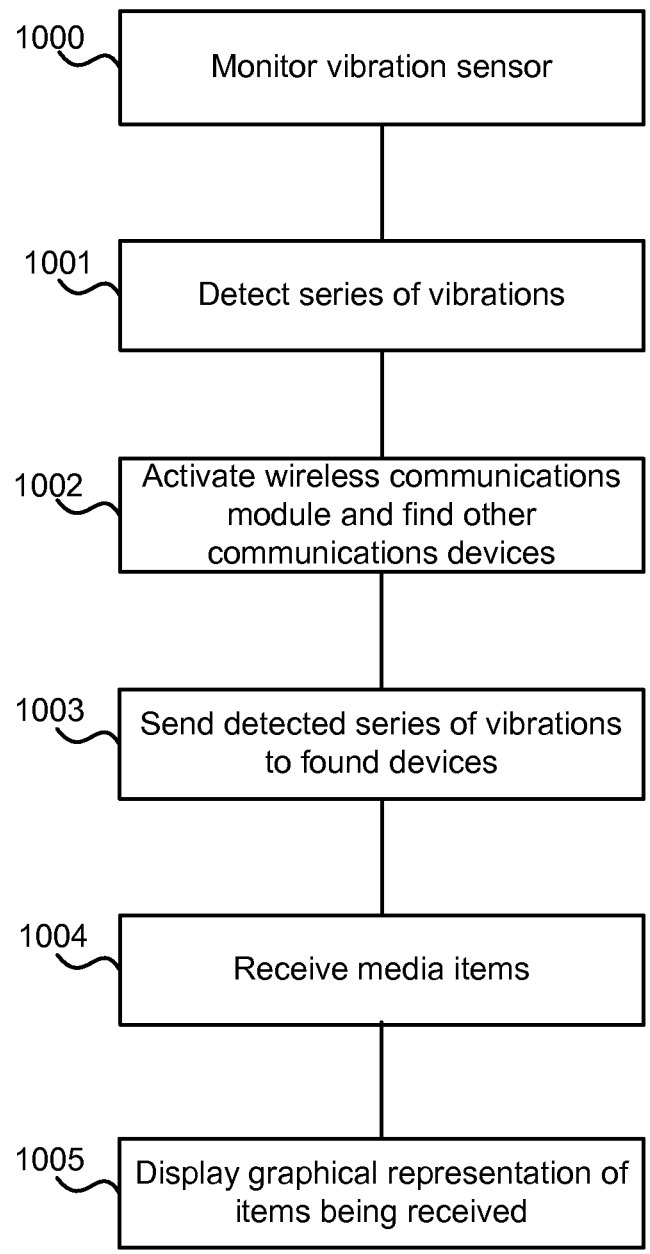
FIG. 10 is a block diagram of an example method of receiving digital media items.

The processes at the media retrieval and display apparatus are described with reference to FIG. 10. The computer monitors the vibration sensor 1000 and detects a series of vibrations 1001 in the event that a user repeatedly taps his or her mobile device against the edge of the retrieval and display apparatus. The computer activates its wireless communications module and finds 1002 any communications devices in range. The computer then sends 1003 details of the detected series of vibrations to each of the in range devices it found. Media items may later be received 1004 as described with reference to FIG. 11. The computer optionally displays at the display (101 FIG. 1) a graphical representation of the media items being received 1005.

Figure 11:
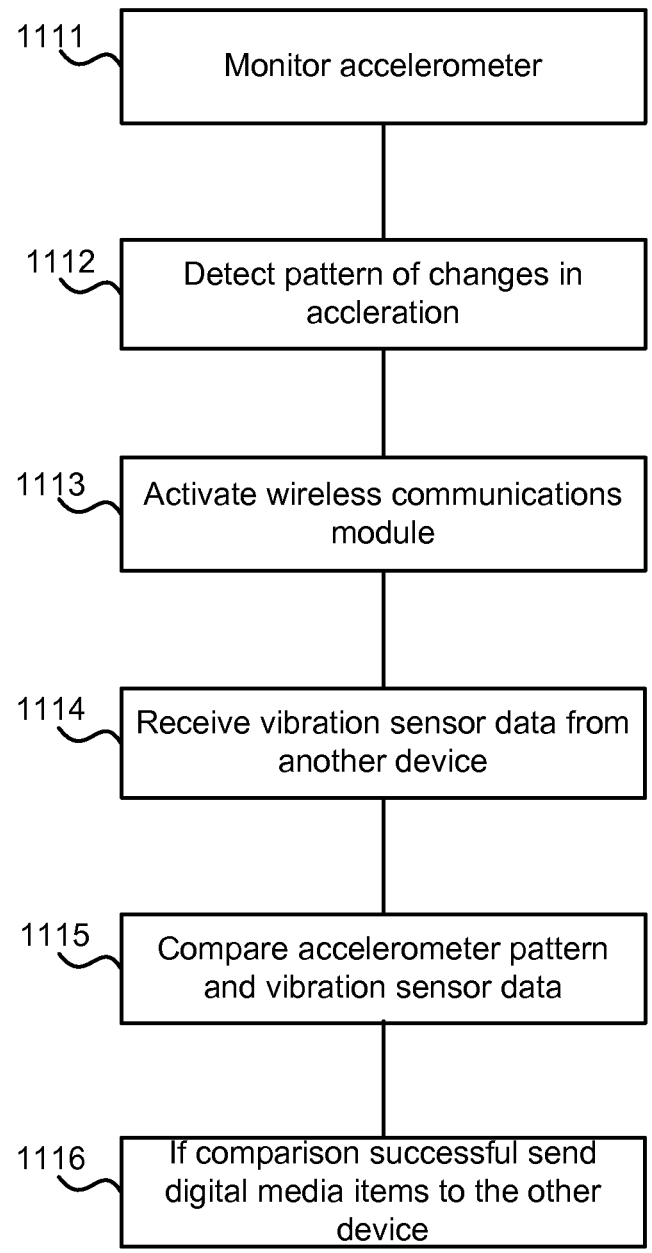
FIG. 11 is a block diagram of an example method of sending digital media items.

The processes at the mobile communications device are described with reference to FIG. 11. The accelerometer is monitored 1111 and when a user taps the device against the media retrieval and display apparatus a pattern of changes in acceleration is detected 1112. A wireless communications module at the device is activated 1113 and vibration sensor data is received from the media retrieval and display apparatus 1114. The accelerometer pattern data is compared with the vibration sensor data 1115 and if the comparison is successful digital media items are sent to the media retrieval and display apparatus 1114.

In some examples described above with reference to FIGS. 10 and 11 the mobile communications device is the entity which makes the comparison between the accelerometer and vibration sensor data. In other embodiments this comparison may be made at the media retrieval and display apparatus. It is also possible for both entities to have this ability.

In some embodiments the form or pattern of the tapping is used to enable a user to specify the type of media items (e.g. mail or photographs) to be transferred from a mobile communications device to the apparatus. For example, rapid, light taps may be used to indicate that only emails are to be transferred and slow, hard taps may be used to indicate that only photographs are to be transferred. Pre-specified rules, criteria or templates are stored at either the mobile communications device and/or the media retrieval and display apparatus. The accelerometer and/or vibration sensor data is assessed using the stored information using software provided at one or both entities. The software then requests transfer of media items of a particular type according to the results of the assessment.

In some embodiments the dedicated apparatus is provided as an "always on" device which innocuously appears to represent a simple domestic aquarium or fish tank. This means that the graphical interface when idle (i.e. when not being currently interacted with) represent a typical scene from an aquarium, with fish swimming around a graphically rendered 3D environment interacting independently with graphical objects representing structures as might be normally found in a fish tank, representing the normal behavior of fish. Unlike PC devices, the editing and general management of photos on the device is not possible in some embodiments. In these cases, the device forces the user to either be more selective about the digital content they put on it or requires that they accept the more random nature of its display of content. Unlike a PC where there is more strict control of the activities of display this apparatus is a more ephemeral and ambient apparatus requiring less direct manipulation.

Figure 12:
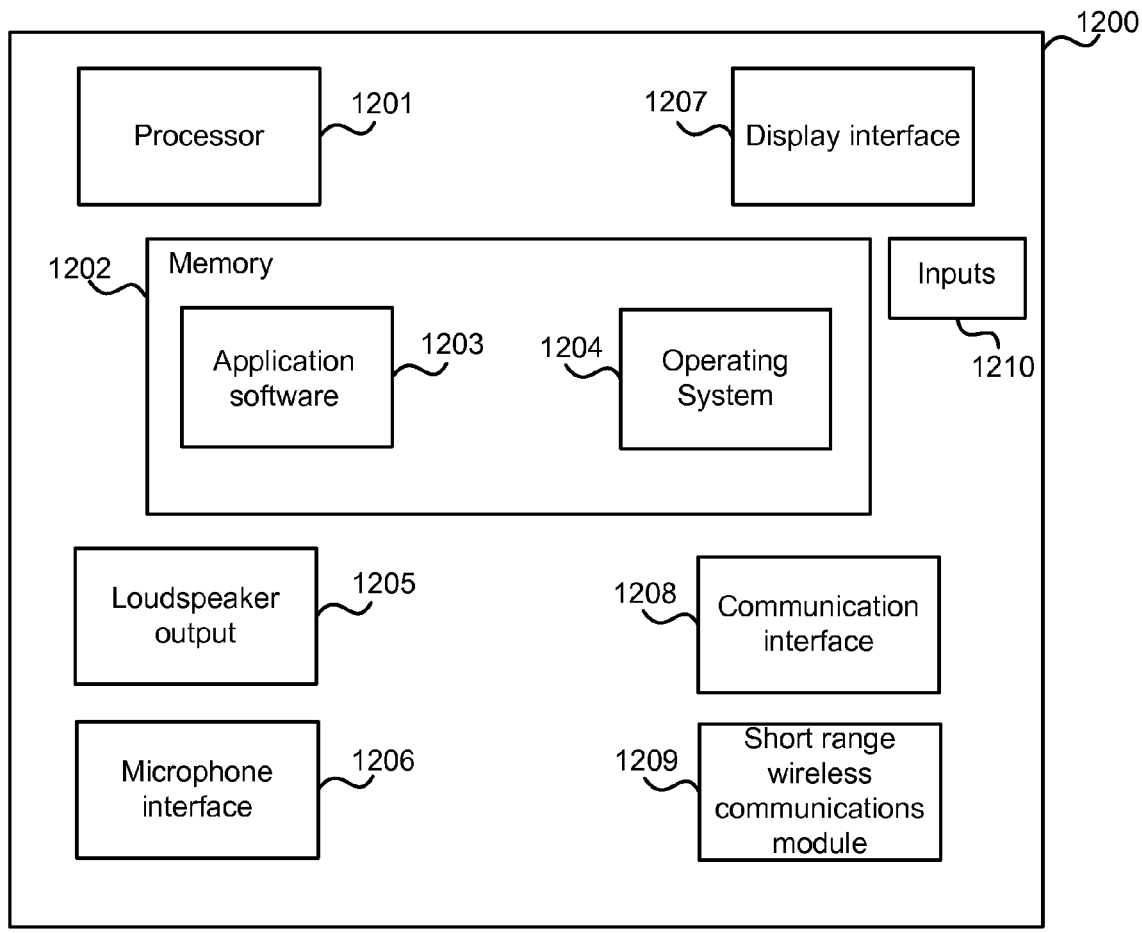
FIG. 12 illustrates an exemplary computing-based device in which embodiments of a digital media display and retrieval apparatus may be implemented.

FIG. 12 illustrates various components of an exemplary computing-based device 1200 which may be implemented as any form of a computing and/or electronic device, and in which embodiments of a media retrieval and display apparatus may be implemented.

The computing-based device 1200 comprises one or more inputs 1210 which are of any suitable type for receiving digital media items, Internet Protocol (IP) input, documents, files or other content. The device also comprises communication interface 1208 to enable the device to communicate with other entities over communications networks of any suitable type. For example, to communicate with databases storing digital media items.

Computing-based device 1200 also comprises one or more processors 1201 which may be microprocessors, controllers or any other suitable type of processors for processing computing executable instructions to control the operation of the device in order to retrieve and display digital media items. Platform software comprising an operating system 1204 or any other suitable platform software may be provided at the computing-based device to enable application software 1203 to be executed on the device.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

A display interface 1207 is provided for controlling a display apparatus associated with the computing device and for receiving user input associated with the display apparatus. The display interface may be arranged to provide a graphical user interface at the display although this is not essential. A loudspeaker output 1205 is optionally provided for providing audio output and a microphone interface 1206 may be provided. A short range wireless communications module 1209 is either integral with the computing device or connected to the computing device in some embodiments.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
    at a display, displaying a plurality of graphical, animated agents each agent being associated with stored search criteria;
    for each agent during an autonomous mode, varying motion of that agent on the display on the basis of at least one behavior parameter which is pseudo random;
    receiving a user input to select one of the agents, wherein the received user input is one of a plurality of different types of user input, each associated with a different type of media retrieval operation;
    providing a graphical user interface to enable a user to create, edit and delete the agents, and to enable a user to transfer agents between user communications devices using a short range wireless communications link;
    triggering a media retrieval operation to retrieve at least one digital media item from a store comprising a plurality of digital media items, the media retrieval operation using the search criteria associated with the selected agent, triggering the media retrieval operation also triggering an animation of the selected agent traveling to a location representing the store; and
    displaying the retrieved digital media item at the display.

2. A method as claimed in claim 1 wherein the user input is arranged to place the agent in a non-autonomous mode during which the motion of the agent varies in a pre-specified manner as part of the media retrieval operation, the plurality of different types of user input including a tickle action, the speed at which at least one of the plurality of different types of user input is performed influencing a speed at which a series of media items are presented.

3. A method as claimed in claim 1 which comprises storing a plurality of behavior parameters for each agent, at least some of those behavior parameters being user specified.

4. A method as claimed in claim 3 wherein at least one of the behavior parameters comprises a measure of how likely an agent is behave aggressively towards another agent.

5. A method as claimed in claim 3 wherein at least one of the behavior parameters comprises a velocity of an agent.

6. A method as claimed in claim 3 wherein at least one of the behavior parameters comprises a time of day at which an agent is to be displayed.

7. A method as claimed in claim 3 wherein at least one of the behavior parameters is a spontaneity parameter used to control a frequency with which the search criteria of an agent are used to retrieve and display a media item without the need for user input to trigger the retrieval.

8. A method as claimed in claim 1 which comprises graphically representing the agents on the display as living organisms.

9. A method as claimed in claim 1 wherein displaying a plurality of graphical, animated agents includes displaying the plurality of graphical, animated agents from a top down perspective, the display being position substantially horizontally.

10. A method as claimed in claim 1 further comprising:
    receiving a second user input to select a second one of the agents, the media retrieval operation using a combination of the search criteria associated with the one of the agents and the search criteria associated with the second one of the agents.

11. A dedicated digital media retrieval and display apparatus comprising:
    a display, displaying a plurality of graphical, animated agents each agent being associated with stored search criteria;
    a memory storing a plurality of digital media items;
    a processor arranged, for each agent during an autonomous mode, to vary motion of that agent on the display on the basis of at least one behavior parameter, which is pseudo random;
    the processor also being arranged to:
    spontaneously create or delete agents according to pre-specified rules;
    transfer agents between user communications devices using a short range wireless communications link;
    select one of the agents as a result of a user input;
    carry out a media retrieval operation to retrieve at least one digital media item from the store, the media retrieval operation using the search criteria associated with the selected agent;
    display an animation of the one of the agents traveling to a location representing the store in response to the one of the agents being selected; and
    display the retrieved digital media item at the display.

12. An apparatus as claimed in claim 11 wherein the processor is arranged to place the agent in a non-autonomous mode as a result of the user input and during which the motion of the agent varies in a pre-specified manner as part of the media retrieval operation.

13. An apparatus as claimed in claim 11 wherein the memory is arranged to store a plurality of behavior parameters for each agent, at least some of those behavior parameters being user specified.

14. An apparatus as claimed in claim 11 further comprising a vibration sensor and a wireless transceiver.

15. An apparatus as claimed in claim 14 which further comprises a monitor arranged to monitor the vibration sensor and wherein the processor is arranged to activate the wireless transceiver if a specified pattern of vibrations is sensed.

16. An apparatus as claimed in claim 15 wherein the wireless transceiver is arranged to send data about the sensed pattern of vibrations to other communications devices.

17. One or more device-readable media, the one or more device-readable media being hardware, with device-executable instructions for performing steps comprising:

- at a display, displaying a plurality of graphical, animated agents each agent being associated with stored search criteria;
- for each agent during an autonomous mode, varying motion of that agent on the display on the basis of at least one behavior parameter which is pseudo random; spontaneously creating agents according to pre-specified rules;
- transferring agents between user communications devices using a short range wireless communications link;
- selecting one of the agents using received user input, wherein the received user input includes one of a plurality of different types, each of the different types being associated with a different type of media retrieval operation, selecting one of the agents triggering an animation of the one of the agents traveling to a location representing a store;
- triggering the media retrieval operation associated with the received user input to retrieve at least one digital media item from a-the store comprising a plurality of digital media items, the media retrieval operation using the search criteria associated with the selected agent;
- displaying the retrieved digital media item at the display.

18. One or more device-readable media as claimed in claim 17 with device-executable instructions for performing steps comprising monitoring a vibration sensor and activating a wireless transceiver if a specified pattern of vibrations are sensed.

19. One or more device-readable media as claimed in claim 18 with device-executable instructions for performing steps comprising sending data about the sensed pattern of vibrations to other communications devices using the wireless transceiver.

20. One or more device-readable media as claimed in claim 17, wherein the device-executable instructions further include instructions to spontaneously edit or delete agents according to pre-specified rules.

* * * * *